2,941,986

COPOLYMERS OF ACRYLONITRILE AND 1-VINYLIMIDAZOLES

Julian Keith Lawson, Jr., Decatur, Ala., assignor to The Chemstrand Corporation, Decatur, Ala., a corporation of Delaware No Drawing. Filed Aug. 2, 1957, Ser. No. 675,836

2 Claims. (Cl. 260—85.5)

This invention relates to acrylonitrile polymers and more particularly to copolymers of acrylonitrile and 1-vinylimidazoles.

Articles, such as filamentary products, formed from polyacrylonitrile are characterized by relatively high softening point, high strength, and insensitivity to water and common organic solvents such as those used in the dry-cleaning industry. However, while the inertness of articles formed from polyacrylonitrile renders such articles of great importance in the textile and other arts, it is disadvantageous when dyed articles are desired, since the conventional dyeing methods are not applicable. Articles having properties the same as or approximating those of polyacrylonitrile but adapted to being dyed in an aqueous dyebath, for example in an aqueous bath containing an acid dyestuff, are much to be desired.

This invention has as one object the preparation of acrylonitrile polymers and blends which can be readily dyed with conventional dyes, using an aqueous dyebath. A further object of the invention is to provide acrylonitrile polymer compositions which can be formed into shaped articles such as oriented fibers, yarns, films, foils, rods, etc. having good tensile strength and susceptibility to being dyed. Another object is the provision of an acrylonitrile copolymer which may be blended with fiber-forming acrylonitrile polymers to improve the dye receptiveness thereof. Other objects will appear hereinafter.

The objects of the invention are achieved by copolymerizing of acrylonitrile with a 1-vinylimidazole to provide copolymers containing, by weight in the polymer molecule from about 50 to about 70 weight percent acrylonitrile and about 30 to about 50 weight percent of the 1-vinylimidazole. These copolymers are readily blended with fiber-forming acrylonitrile polymers and the resulting materials exhibit excellent dye receptiveness and other physical properties.

The acrylonitrile/1-vinylimidazole copolymers may be prepared by several different polymerization methods including mass or bulk polymerization, solution polymerization or by the so-called emulsion or suspension polymerization method in aqueous medium. The methods of preparation preferably utilize a mixed-monomer addition to technique in accordance with which the monomers are mixed in the proportions desired in the ultimate copolymer and added continuously to the reaction medium throughout the course of the reaction, the conditions of the copolymerization being selected to yield copolymers of substantially uniform composition and molecular weight. As an example, such substantially uniform copolymers may be obtained by the solution polymerization method described in Chaney Patent No. 2,537,031, issued January 9, 1951.

The copolymerization of acrylonitrile and the 1-vinylimidazole may be catalyzed with a wide variety of free radical-producing substances, for example, peroxy compounds and preferably the water-soluble peroxy compounds such as hydrogen peroxide, sodium peroxide, potassium persulfate, calcium percarbonate, and other peroxy acid salts. Azo catalysts may also be used, suitable members of that class being, for example, azo-2,2'-diisobutyronitrile, dimethyl-2,2'-azodiisobutyrate, 2,2'-azobis(2,4-dimethylvaleronitrile), and 2,2'-azodiisobutyramide. In addition, diazoaminobenzene may be used as catalyst. It appears that the catalyst used in the copolymerization of acrylonitrile and the 1-vinylimidazole influences the solubility of the resulting copolymer. The azo catalysts are preferred when it is desired to produce a copolymer which is soluble in N,N-dimethylacetamide, since the copolymers of acrylonitrile and a 1-vinylimidazole prepared using a peroxy catalyst such as potassium persulfate have not been found to exhibit good solubility in that solvent.

The emulsion or dispersing agents used when the copolymerization is effected by the emulsion or suspension method may be any compound containing a hydrophobic and a hydrophilic group. Suitable emulsifying or dispersing agents include the common soaps such as sodium stearate and other alkali metal salts of high molecular weight carboxylic acids and mixtures thereof as obtained by the saponification of animal and vegetable fats, the salts of sulfonated hydrocarbons, for example the alkali metal salts of sulfonated paraffins, sulfonated naphthalenes, sulfonated alkyl-benzenes, the salts of formaldehyde-condensed sulfonic acids and particularly the sodium salt of formaldehyde-condensed alkylaryl sulfonic acids, the salts of triethanolamine and other "amino soaps," and alkali salts of sulfuric half-esters of fatty alcohols.

The acrylonitrile/1-vinylimidazole copolymers may also be prepared by the "redox" method in the presence of sulfur dioxide, sodium bisulfite, sodium thiosulfate and other compounds containing low-valent sulfur. The "redox" method of copolymerization usually results in high molecular weight copolymers at lower operating temperatures.

The copolymers may be of any suitable molecular weight, but ordinarily the molecular weight is within the range of 15,000 to 300,000, more particularly from 35,000 to 300,000 or higher, and advantageously is within the range of about 50,000 to about 150,000 as calculated from viscosity measurements using the well-known Staudinger equation.

Molecular weight regulators may be included in the copolymerization mix. Examples of suitable regulators are t-dodecyl mercaptan, thioglycollic acid, thiourea, mercaptobenzothiazole, and carbon tetrachloride. These and other of the known regulators tend to inhibit the formation of excessively high molecular weight polymer fractions or increments and to induce a more uniform size of polymer molecule.

In utilizing the emulsion or suspension polymerization technique the copolymerization is preferably initiated by heating a reactor containing water to the temperature at which the polymerization is to be conducted, and the reactor is then charged with at least a portion of the catalyst and with the dispersing or emulsifying agent. If a molecular weight regulator and/or a "redox" agent are to be used, these are charged to the reactor with or immediately after the addition of the dispersing agent and the portion of the catalyst. The mixture is vigorously agitated, for example by means of a mechanical stirrer or by tumbling or rotating the reactor. When the reaction medium has been prepared and the conditions of the copolymerization have been established, the monomers, either pre-mixed or in separate streams, are added to the reactor gradually, in the proportions desired in the copolymer. Substantially uniform reaction conditions are thus maintained in the vessel. Similarly, the catalyst, emulsifying agent, and other reagents are added gradually or intermittently throughout the reaction, to maintain in the reactor, exactly or approximately, a uniform and constant concentration of the essential reagents from the beginning to the end of the copolymerization. The reaction is allowed to proceed until the monomers have been added in the predetermined amount after which it is terminated by lowering the temperature, by destroying the catalyst, or by rapid steam-distillation of unreacted monomers.

In order to maintain substantially uniform reaction conditions throughout the copolymerization, the reaction is preferably carried out at the reflux temperature, and the monomers are added at a rate correlated with the rate and temperature of reflux to maintain the reflux temperature substantially constant. The relative proportions of the monomers added to the reactor should correspond to the proportion of acrylonitrile to 1-vinylimidazole in the copolymer being formed.

Upon completion of the polymerization, an emulsion or suspension of solid polymer in the aqueous medium is obtained. The copolymer may be recovered by coagulation followed by filtration.

As previously indicated, copolymers containing, by weight in the polymer molecule, from about 50 to about 70 percent acrylonitrile and about 50 to about 30 percent of a 1-vinylimidazole may be obtained. More preferably, copolymers are prepared containing from 50 to 65 percent acrylonitrile and 50 to 35 percent of the 1-vinylimidazole. In one preferred embodiment of the invention, the polymer is a copolymer of 50 percent acrylonitrile and correspondingly 50 percent of the 1-vinylimidazole.

Those acrylonitrile/1-vinylimidazole copolymers which contain less than 80 percent of acrylonitrile are advantageously used for blending with acrylonitrile polymers which are not receptive to dyestuffs, to obtain improved dyeable blends, or they may be used as coating compositions or for other purposes.

The 1-vinylimidazoles that may be copolymerized with acrylonitrile include 1-vinylimidazole per se and the corresponding polymerizable 1-vinylimidazoles which may have hydrocarbon groups of preferably not more than five carbons attached to the imidazole nucleus, i.e., preferably 1-vinylimidazoles having only carbon, hydrogen, and the two nitrogen atoms. Examples of the nuclearly alkylated 1-vinylimidazoles which may be copolymerized with acrylonitrile in the practice of this invention include 2-ethyl-1-vinylimidazole, 2-methyl-1-vinylimidazole, 4-ethyl-1-vinylimidazole, 4-methyl-1-vinylimidazole, 5-ethyl-1-vinylimidazole, 5-methyl-1-vinylimidazole, 2,4-diethyl-1-vinylimidazole, 4,5-diethyl-1-vinylimidazole, 2,5-diethyl-1-vinylimidazole, 2,4-dimethyl-1-vinylimidazole, 4,5-dimethyl-1-vinylimidazole, 2,5-dimethyl-1-vinylimidazole, 2-butyl-1-vinylimidazole, 4-amyl-1-vinylimidazole, etc., and the 2-, 4-, and 5-, 1-vinylimidazoles generally in which the alkyl group contains up to five carbons, and, in the case of those derivatives which contain more than one alkyl group, the alkyl groups are the same or different.

Further details of the preparation of the new polymers and use in blends are set forth in the following embodiment of the invention, the parts being by weight unless otherwise stated.

Example I

A mixture of 25 parts of acrylonitrile, 25 parts of 1-vinylimidazole, 100 parts of water, 2 parts of sodium stearate, and 0.5 part of diazoaminobenzene was charged to a pressure vessel. The vessel was flushed with nitrogen and sealed, after which it was placed in a tumbling oven. The vessel and its contents were maintained at 90° C. for 16 hours. The copolymer was recovered after washing the reaction mixture with water. It was blended in N,N-dimethylacetamide with an acrylonitrile copolymer containing 95 percent of acrylonitrile which was not normally receptive to the acid dyes to obtain a blend of 15 percent solids (88 percent of the base polymer and 12 percent of the 1-vinylimidazole copolymer), and the solution was spun into a N,N-dimethylacetamide-water coagulating mixture.

The fibers were washed with water and processed in the usual manner. During their processing they were stretched and oriented. In a dyebath containing 41 gms. of water, 0.1 gm. sulfuric acid, and 0.02 gm. Wool Fast Scarlet for each gram of fiber, the fibers developed a brilliant scarlet color. Using both the standard dyebath mentioned, and a bath containing five times as much dye, essentially complete dyebath exhaustion was obtained in one hour at 100° C.

When the above embodiment is repeated with other fiber-forming acrylonitrile polymers, other acrylonitrile-1-vinylimidazole polymers such as those of the methyl-1-vinylimidazoles, and of proportions of 60 and 65 percent acrylonitrile and 40 and 35 percent 1-vinylimidazole similar excellent dyeable fibers may be formed.

The foregoing detailed description has been given for illustrative purposes only, and no unnecessary limitations are to be understood therefrom. The invention is not limited to the exact details shown and described, since obvious modifications will occur to those skilled in the art.

This application is a continuation-in-part of my co-pending application Serial No. 214,231, filed March 6, 1951, now abandoned.

I claim:

1. A binary copolymer of about 50 percent by weight acrylonitrile and about 50 percent by weight of a monomer selected from the group consisting of 1-vinylimidazole and alkyl substituted 1-vinyl-imidazoles in which the alkyl group contains not more than 5 carbon atoms.

2. A binary copolymer of 50 percent by weight acrylonitrile and 50 percent by weight 1-vinylimidazole.

References Cited in the file of this patent

UNITED STATES PATENTS

| | | |
|---|---|---|
| 2,603,621 | Craig et al. | July 15, 1952 |
| 2,661,346 | Wesp et al. | Dec. 1, 1953 |
| 2,688,008 | Chaney et al. | Aug. 31, 1954 |
| 2,831,827 | Hopff et al. | Apr. 22, 1958 |